(12) United States Patent
Liang et al.

(10) Patent No.: US 8,831,156 B2
(45) Date of Patent: Sep. 9, 2014

(54) INTERFERENCE CANCELLATION FOR NON-ORTHOGONAL CHANNEL SETS

(75) Inventors: Jiye Liang, Beijing (CN); Michael Fan, San Diego, CA (US); Yisheng Xue, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 13/504,670

(22) PCT Filed: Nov. 27, 2009

(86) PCT No.: PCT/CN2009/075176
§ 371 (c)(1),
(2), (4) Date: Aug. 31, 2012

(87) PCT Pub. No.: WO2011/063567
PCT Pub. Date: Jun. 3, 2011

(65) Prior Publication Data
US 2013/0195232 A1    Aug. 1, 2013

(51) Int. Cl.
*H03D 1/04*    (2006.01)
*H04B 1/10*    (2006.01)
*H04B 1/7107*  (2011.01)

(52) U.S. Cl.
CPC .............. *H04B 1/10* (2013.01); *H04B 1/71072* (2013.01); *H04B 1/7107* (2013.01)
USPC ........ 375/346; 375/144; 375/148; 375/E1.03; 455/63.1

(58) Field of Classification Search
None
See application file for complete search history.

(56) References Cited

U.S. PATENT DOCUMENTS

| | | |
|---|---|---|
| 5,579,304 A | 11/1996 | Sugimoto et al. |
| 6,137,788 A | 10/2000 | Sawahashi et al. |
| 6,240,099 B1 | 5/2001 | Lim et al. |
| 6,363,103 B1 | 3/2002 | Buehrer et al. |
| 6,404,760 B1 | 6/2002 | Holtzman et al. |
| 6,665,288 B1 | 12/2003 | Ottosson et al. |
| 6,667,964 B1 | 12/2003 | Seki et al. |
| 6,760,315 B1 | 7/2004 | Esmailzadeh et al. |
| 6,928,104 B2 | 8/2005 | Pan et al. |

(Continued)

FOREIGN PATENT DOCUMENTS

| | | |
|---|---|---|
| CN | 1295393 A | 5/2001 |
| CN | 1355629 A | 6/2002 |

(Continued)

OTHER PUBLICATIONS

Taiwan Search Report—TW099106352—TIPO—Mar. 13, 2013.

(Continued)

*Primary Examiner* — Adolf DSouza
(74) *Attorney, Agent, or Firm* — Darren M. Simon

(57) ABSTRACT

Techniques for interference cancellation in a CDMA system. In an exemplary embodiment, a channel set scrambled using a secondary scrambling code (SSC) is estimated and cancelled along with a channel set scrambled using a primary scrambling code (SSC). The estimation and cancellation of the SSC channel set may proceed in series with the estimation and cancellation of the PSC channel set. Alternatively, the estimation of the SSC channel set may proceed in parallel with the estimation of the PSC channel set, and the cancellations of the PSC and SSC channel sets may be simultaneously performed. Multiple iterations of such estimation and cancellation may be performed in a successive interference cancellation (SIC) scheme.

28 Claims, 14 Drawing Sheets

(56) References Cited

U.S. PATENT DOCUMENTS

| | | |
|---|---|---|
| 6,956,893 B2 | 10/2005 | Frank et al. |
| 6,963,546 B2 | 11/2005 | Misra et al. |
| 7,035,284 B2 | 4/2006 | Willenegger et al. |
| 7,190,710 B2 | 3/2007 | Yousef et al. |
| 7,266,168 B2 | 9/2007 | Kwak et al. |
| 7,280,585 B2 | 10/2007 | Sriram et al. |
| 7,302,233 B2 | 11/2007 | Onggosanusi et al. |
| 7,339,980 B2 | 3/2008 | Grant et al. |
| 7,428,260 B2 | 9/2008 | Yellin |
| 7,469,003 B2 | 12/2008 | Papasakellariou |
| 7,477,634 B1 | 1/2009 | McKown |
| 7,991,041 B2 | 8/2011 | Shim et al. |
| 2002/0012264 A1 | 1/2002 | Ishiwara |
| 2002/0018451 A1 | 2/2002 | Sharony |
| 2002/0131390 A1 | 9/2002 | Kuo et al. |
| 2002/0196841 A1 | 12/2002 | Karna |
| 2003/0012264 A1 | 1/2003 | Papasakellariou et al. |
| 2003/0072397 A1 | 4/2003 | Kim et al. |
| 2003/0142655 A1 | 7/2003 | Higuchi et al. |
| 2004/0120299 A1 | 6/2004 | Kidiyarova-Shevchenko et al. |
| 2004/0146024 A1 | 7/2004 | Li et al. |
| 2004/0203812 A1 | 10/2004 | Malladi et al. |
| 2004/0223538 A1 | 11/2004 | Zeira |
| 2005/0094816 A1 | 5/2005 | Lindoff et al. |
| 2005/0174983 A1 | 8/2005 | Naguleswaran et al. |
| 2005/0276314 A1* | 12/2005 | Dateki et al. ................. 375/148 |
| 2005/0278609 A1 | 12/2005 | Kim et al. |
| 2005/0281214 A1 | 12/2005 | Misra et al. |
| 2006/0239335 A1 | 10/2006 | Rouphael et al. |
| 2007/0093261 A1 | 4/2007 | Hou et al. |
| 2007/0104150 A1 | 5/2007 | Fernandez-Corbaton et al. |
| 2007/0110131 A1 | 5/2007 | Guess et al. |
| 2007/0110132 A1 | 5/2007 | Guess et al. |
| 2007/0147329 A1 | 6/2007 | Soriaga et al. |
| 2007/0270100 A1 | 11/2007 | Agrawal et al. |
| 2008/0112382 A1 | 5/2008 | Shim et al. |

FOREIGN PATENT DOCUMENTS

| | | |
|---|---|---|
| CN | 101536339 | 9/2009 |
| CN | 101536340 | 9/2009 |
| EP | 1098452 A1 | 5/2001 |
| JP | H09505199 A | 5/1997 |
| JP | H11136212 A | 5/1999 |
| JP | 2994752 B2 | 12/1999 |
| JP | 2000083011 A | 3/2000 |
| JP | 2000509580 A | 7/2000 |
| JP | 2000315993 A | 11/2000 |
| JP | 3285725 B2 | 5/2002 |
| JP | 2002233397 A | 8/2002 |
| JP | 200520402 | 1/2005 |
| JP | 2005522088 A | 7/2005 |
| JP | 2005533460 A | 11/2005 |
| JP | 2006517079 A | 7/2006 |
| JP | 2006519528 A | 8/2006 |
| JP | 2009514402 | 4/2009 |
| WO | 9303556 A1 | 2/1993 |
| WO | 9601544 A2 | 1/1996 |
| WO | WO 9642146 A1 | 12/1996 |
| WO | WO 9741647 A1 | 11/1997 |
| WO | WO 02073937 | 9/2002 |
| WO | WO 03084097 A1 | 10/2003 |
| WO | WO 2004070958 A2 | 8/2004 |
| WO | WO 2004079975 | 9/2004 |
| WO | WO 2004095713 | 11/2004 |
| WO | 2007050926 A2 | 5/2007 |

OTHER PUBLICATIONS

Supplementary European Search Report—EP09851580—Search Authority—Munich—Sep. 5, 2013.

Bentrica, et al., A Linear Group Polynomial-Expansin Successive Interference Cancellation Detector, Sep. 7-10, 2003, Personal Indoor and Mobile Radio Communications, 2003. MRC 2003. 14th IEEE Proceedings on, vol. 2, pp. 1546-1550.

International Search Report and Written Opinion—PCT/CN2009/075176, International Search Authority—European Patent Office—Sep. 9, 2010.

Johansson et al., Linear Group-wise Successive Interference Cancellation in CDMA, Sep. 2-4, 1998, Spread Spectrum Techniques and Applications, 1998, Proceedings., 1998 IEEE 5th International Symposium on, vol. 1, pp. 121-126.

Rasmussen et al., A Matrix-algebraic Approach to Succesive Interference Cancellation in CDMA, Jan. 2000, Communications, IEEE Transactions on, vol. 48, Issue 1, pp. 145-151.

Silvester, A., Analysis of Reverse Link Capacity for Cellular CDMA Systems Employing Group Successive Interference Cancellation, May 7-10, 2006, Vehicular Technology Conference, 2006. VTC 2006-Spring. IEEE 63rd, vol. 5, pp. 2513-2517.

Tsai C-H et al: "Hybrid MMSE and SIC for Multiuser Detection" IEEE VTS 53rd. Vehicular Technology Conference, vol. Conf. 53, May 6, 2001, pp. 1779-1783, XP001082449 New York, NY, US ISBN: 978-0-7803-6728-9.

Varanasi, M., Group Detection for Synchronous Gaussian Code-Division Multiple-Access Channels, Jul. 1995, Information Theory, IEEE Transactions on, vol. 41, Issue 4, pp. 1083-1096.

* cited by examiner

INTERFERENCE CANCELLATION FOR NON-ORTHOGONAL CHANNEL SETS

RELATED APPLICATIONS

This application is related to U.S. patent application Ser. No. 11/560,060, entitled "Iterative Detection and Cancellation for Wireless Communication," filed Nov. 15, 2006, and to U.S. patent application Ser. No. 11/560,206, entitled "Successive Equalization and Cancellation and Successive Mini Multi-User Detection for Wireless Communication," filed Nov. 15, 2006, the contents of which are hereby incorporated by reference in their entirety.

TECHNICAL FIELD

The present invention relates generally to digital communications, and more specifically, to techniques for interference cancellation in wireless communications systems.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. For example, such systems can conform to standards such as Third-Generation Partnership Project 2 (3gpp2, or "cdma2000"), Third-Generation Partnership (3gpp, or "W-CDMA"), or Long Term Evolution ("LTE").

In a wireless communications system, it is generally desired to maximize the capacity, or number of users, the system can reliably support given the resources. In a CDMA system, the capacity may be limited by the available code channel dimensions, which may be determined by the number of available orthogonal channelization (e.g., Walsh) codes as scrambled using a given scrambling code, e.g., a "primary" scrambling code. When it is desired to admit more users than channelization codes available, a system may employ one or more non-orthogonal channel sets, e.g., as scrambled using one or more "secondary" scrambling codes. The use of such non-orthogonal channel sets, however, means that the channel dimensions from a single transmitter station may no longer be orthogonal to each other, potentially leading to increased intra-cell and inter-cell interference in the system.

It would be desirable to provide techniques for cancelling at a CDMA receiver the interference caused by the use of non-orthogonal channel sets at a transmitter.

SUMMARY

An aspect of the present disclosure provides a method comprising estimating a first PSC channel set scrambled by a first primary scrambling code; cancelling the estimated first PSC channel set from a received signal; estimating a first SSC channel set scrambled by a first secondary scrambling code, the first SSC channel set being non-orthogonal to the first PSC channel set, the first PSC and SSC channel sets being transmitted from a single station; and cancelling the estimated first SSC channel set.

Another aspect of the present disclosure provides an apparatus comprising: a first PSC estimation unit configured to estimate a first PSC channel set scrambled by a first primary scrambling code; a first PSC cancellation unit configured to cancel the estimated first PSC channel set from a received signal; a first SSC estimation unit configured to estimate a first SSC channel set scrambled by a first secondary scrambling code, the first SSC channel set being non-orthogonal to the first PSC channel set, the first PSC and SSC channel sets being transmitted from a single station; and a first SSC cancellation unit configured to cancel the estimated first SSC channel set.

Yet another aspect of the present disclosure provides an apparatus comprising: means for estimating a first PSC channel set scrambled by a first primary scrambling code; means for cancelling the estimated first PSC channel set from a received signal; means for estimating a first SSC channel set scrambled by a first secondary scrambling code, the first SSC channel set being non-orthogonal to the first PSC channel set, the first PSC and SSC channel sets being transmitted from a single station; and means for cancelling the estimated first SSC channel set.

Yet another aspect of the present disclosure provides a computer-readable storage medium storing instructions for causing a computer to: estimate a first PSC channel set scrambled by a first primary scrambling code; cancel the estimated first PSC channel set from a received signal; estimate a first SSC channel set scrambled by a first secondary scrambling code, the first SSC channel set being non-orthogonal to the first PSC channel set, the first PSC and SSC channel sets being transmitted from a single station; and cancel the estimated first SSC channel set.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
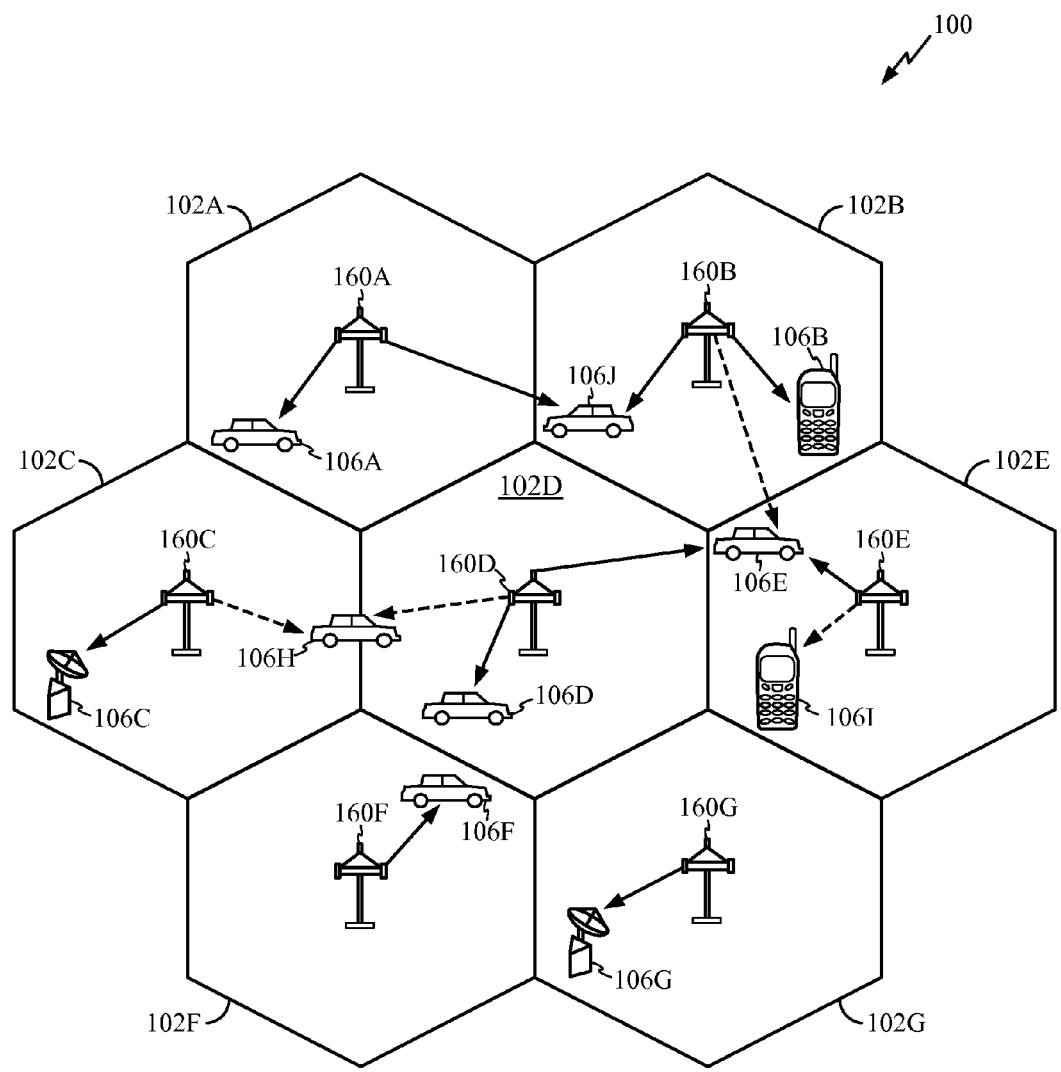
FIG. 1 illustrates a wireless cellular communications system in which the techniques of the present disclosure may be applied.

Communications systems may use a single carrier frequency or multiple carrier frequencies. Referring to FIG. 1, in a wireless cellular communications system 100, reference numerals 102A to 102G refer to cells, reference numerals 160A to 160G refer to Node B's, and reference numerals 106A to 106I refer to User Equipment (UE's). A communications channel includes a downlink (also known as a forward link) for transmissions from a Node B 160 to a UE 106 and an uplink (also known as a reverse link) for transmissions from the UE 106 to the Node B 160. A base station is also referred to as a base transceiver system (BTS), an access point, or a base station. The UE 106 is also known as an access station, a remote station, a mobile station or a subscriber station. The UE 106 may be mobile or stationary. Each link may incorporate a different number of carrier frequencies. Furthermore, a UE 106 may be any data device that communicates through a wireless channel or through a wired channel, for example using fiber optic or coaxial cables. A UE 106 may further be any of a number of types of devices including but not limited to PC card, compact flash, external or internal modem, or wireless or wireline phone.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in CDMA systems, each user is given the entire frequency spectrum for all of the time but distinguishes its transmission through the use of a code.

While certain exemplary embodiments of the present disclosure may be described hereinbelow for operation according to the W-CDMA standard, one of ordinary skill in the art will appreciate that the techniques may be readily applied to other digital communications systems. For example, the techniques of the present disclosure may also be applied to systems based on the cdma2000 wireless communications standard, and/or any other communications standards. Such alternative exemplary embodiments are contemplated to be within the scope of the present disclosure.

Figure 2A:
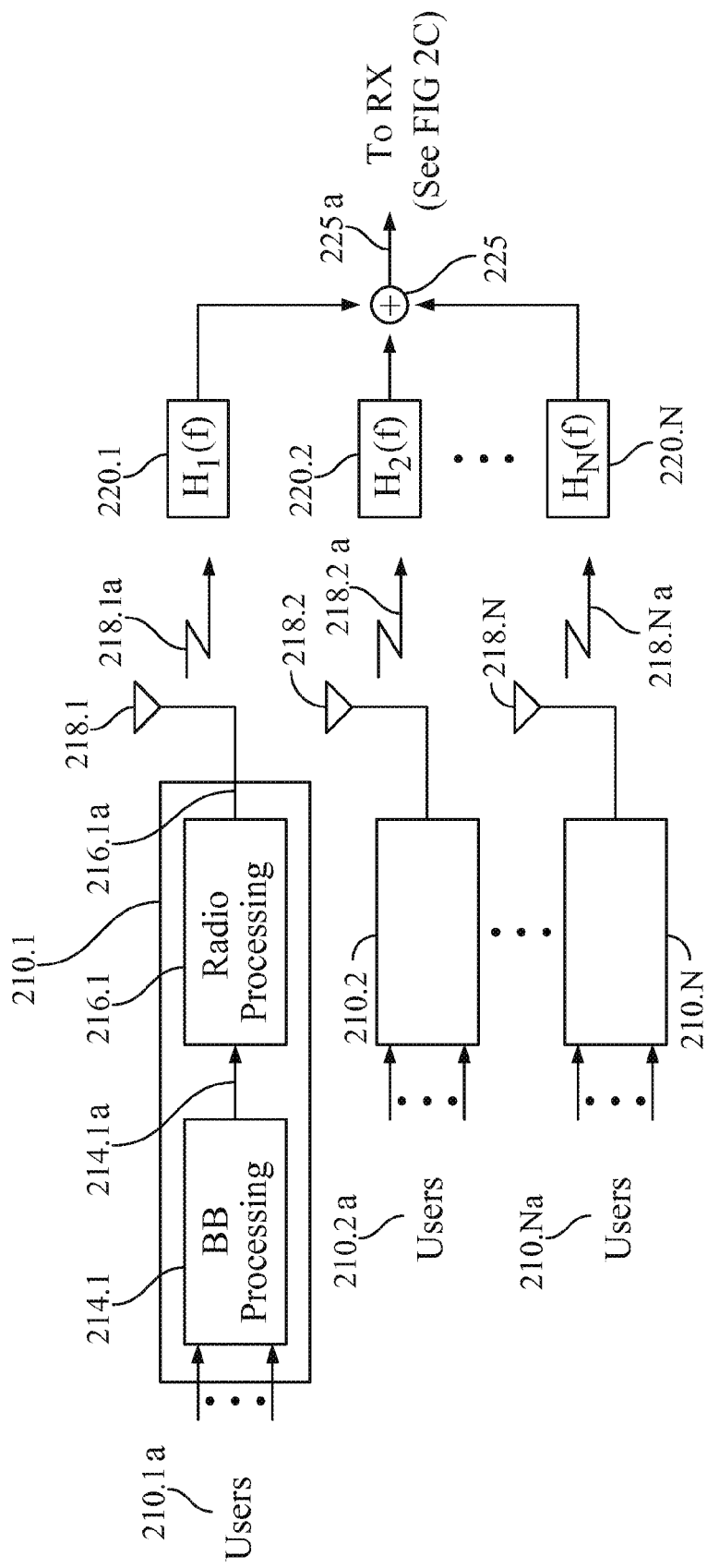
FIG. 2A illustrates an example of downlink processing performed at one or more base stations according to a CDMA system.

FIG. 2A illustrates an example of downlink processing performed at one or more Node B's (or base stations) according to a CDMA system. It will be appreciated that FIG. 2A is shown for illustrative purposes only, and is not meant to limit the scope of the present disclosure. It will be further appreciated that the techniques disclosed herein may be readily applied to other types of communications links, e.g., on one or more uplinks, and such alternative exemplary embodiments are contemplated to be within the scope of the present disclosure.

In FIG. 2A, a plurality of stations 210.1 through 210.N is shown. For example, a station may be a Node B, or base station, associated with a cell or sector in a cellular communications system. Referring to station 210.1, data from a plurality of users 210.1a is provided to the station 210.1 for transmission over a wireless communications link. Within the station 210.1, a baseband processing unit 214.1 receives the data from users 210.1a and processes the information according to signal processing techniques known in the art. For example, in a W-CDMA downlink, the unit 214.1 may perform operations such as coding, interleaving, rate matching, channelization, scrambling, etc. Specific operations performed by the unit 214.1 relevant to this disclosure are described in further detail later herein with reference to FIG. 2B.

Following baseband processing by the unit 214.1, a baseband signal 214.1a is provided to a radio processing unit 216.1. The unit 216.1 may perform, e.g., up-conversion of the baseband signal 214.1a to radio frequency (RF), and further signal conditioning and/or amplification of the RF signal, according to principles known in the art. The unit 216.1 generates a radio signal 216.1a that is coupled to an antenna 218.1 for transmission over the air as signal 218.1a. In FIG. 2A, stations 210.2 through 210.N may each perform operations corresponding to those described for station 210.1 on sets of users 210.2a through 210.Na, resulting in the generation of radio signals 218.2a through 218.Na.

Each of radio signals 218.1a through 218.Na is propagated through a corresponding radio channel 220.1 through 220.N, characterized by channel transfer functions $H_1(f)$ through $H_N(f)$, respectively. It will be appreciated that a radio channel may introduce effects such as multipath delay, fading, other path loss, etc., to the radio signals. At a receiver (not shown in FIG. 2A), the signals received over all radio channels are additively combined at 225 to generate a composite radio signal 225a.

Figure 2B:
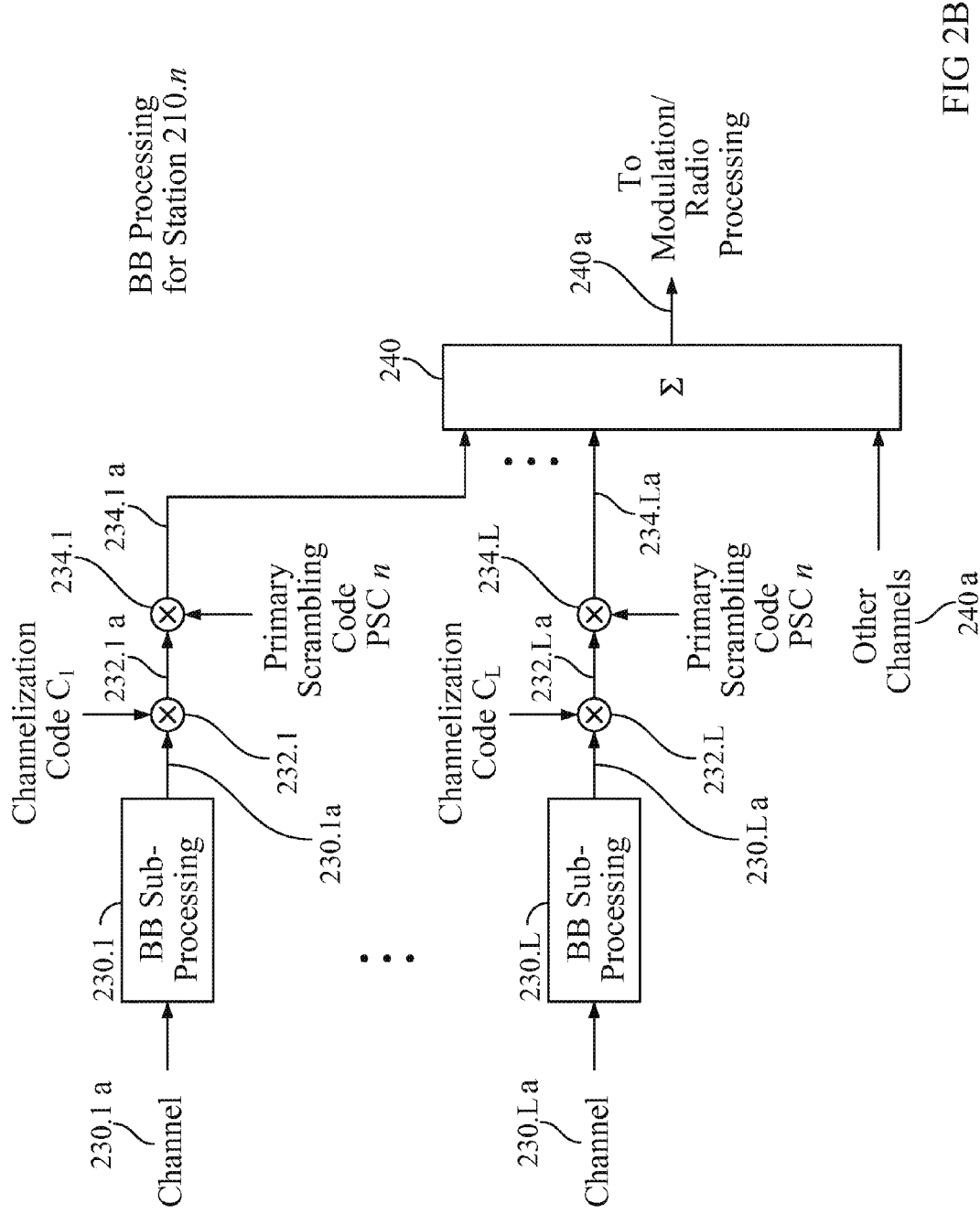
FIG. 2B further illustrates exemplary processing that may be performed within a baseband processing unit for an arbitrary station of the stations shown in FIG. 2A.

FIG. 2B further illustrates exemplary processing that may be performed within a baseband processing unit 214.n for an arbitrary station 210.n of the stations 210.1 through 210.N shown in FIG. 2A. It will be appreciated that FIG. 2B is shown for illustrative purposes only, and is not meant to limit the scope of the present disclosure.

In FIG. 2B, the data to be transmitted is mapped to a plurality L of channels 230.1a through 230.La (or a "first PSC channel set"). In an implementation, each of channels 230.1a through 230.La may correspond to one or more physical channels, e.g., as defined for the downlink according to the W-CDMA standard, and may carry data associated with users 210.na (not shown) serviced by a transmitting station 210.n.

Referring to channel 230.1a, data is provided to a baseband sub-processing unit 230.1, which may implement a subset of the operations performed by the unit 214.1 shown in FIG. 2A to generate a baseband signal 230.1a. The data in channel 230.1a is multiplied with a channelization code $C_1$ using a multiplier 232.1 to generate a signal 232.1*a* in a process known as "channelization." It will be appreciated that in a CDMA system, each channelization code may be designed to be orthogonal to the channelization codes of other channels, and the baseband signals 230.1*a* through 230.1L for the channels 230.1*a* through 230.La may be multiplexed onto a single composite signal. In an exemplary embodiment, the channelization code may be a Walsh code or Walsh-based orthogonal variable spreading factor (OVSF) code, and may be real or complex depending on the system specifications.

Following channelization, the signal 232.1*a* is multiplied with a primary scrambling code (PSC) PSC n to generate a signal 234.1*a* in a process known as "scrambling." In an implementation, each station 210.n is assigned a distinct PSC, and the PSC of each station may be designed to have low cross-correlation properties with the PSC's of other stations. In this manner, a receiver receiving a composite signal such as signal 225*a* in FIG. 2A containing the signals from all stations may separate out a signal from station 210.n using the primary scrambling code PSC n assigned to that station, and may separate out a channel from the channels from station 210.n using the channelization code assigned to that channel.

Note scrambling for each of channels 230.1*a* through 230.La may use the same primary scrambling code PSC n associated with the station 210.n. In FIG. 2B, the scrambled signals 234.1*a* through 234.La are provided to a summer 240, which may also add signals corresponding to other channels 240*a*, to generate a composite signal 240*a*. It will be appreciated that such other channels 240*a* may be processed, e.g., using techniques other than those shown for channels 230.1*a* through 230.La. The signal 240*a* may be further processed, e.g., using modulation and radio processing techniques as implemented in the rest of the station 210.n.

Figure 2C:
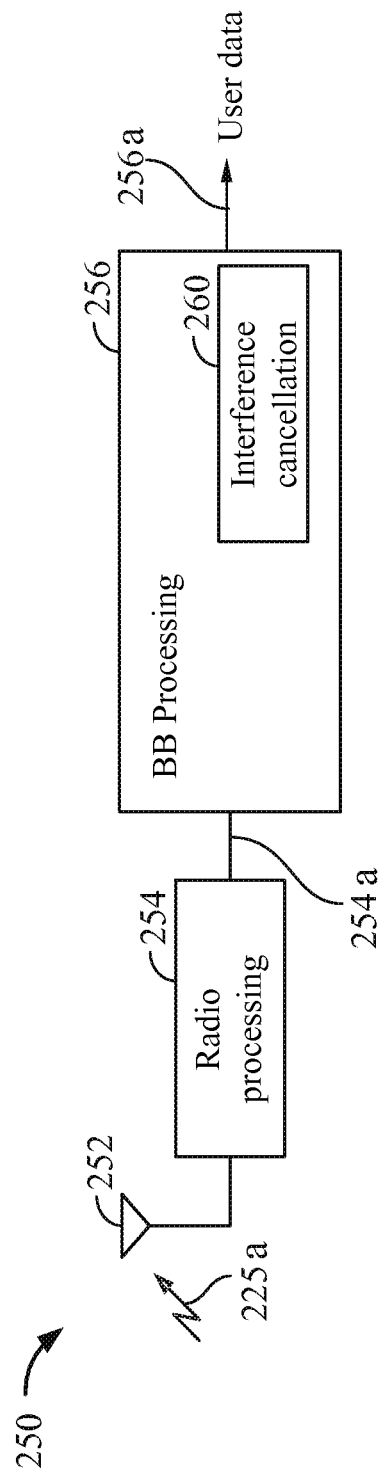
FIG. 2C illustrates exemplary processing that may be performed at a receiver for receiving and recovering a desired user's data from the composite signal shown in FIG. 2A.

FIG. 2C illustrates exemplary processing that may be performed at a receiver 250 for receiving and recovering a desired user's data from the composite signal 225*a* shown in FIG. 2A. It will be appreciated that FIG. 2C is shown for illustrative purposes only, and is not meant to limit the scope of the present disclosure.

In FIG. 2C, an antenna 252 receives the composite signal 225*a*, and couples the signal to a radio processing unit 254. The radio processing unit 254 may perform operations known in the art to convert a radio signal to baseband samples 254*a* for further processing by baseband processing unit 256. The unit 256 may perform baseband operations to recover user data 256*a*, which may correspond to one or more of the user data streams shown in FIG. 2A associated with a desired user. Such baseband operations may include, e.g., demodulation, de-scrambling, de-channelization, de-interleaving, decoding, etc.

It will be appreciated that to recover a data stream associated with a desired user, the receiver 250 may encounter substantial interference present in the composite signal 225*a* due to, e.g., signals transmitted by other stations (scrambled using other PSC's), as well as multipath components from the desired user (scrambled using the same PSC) caused by multipath propagation in the wireless channel(s). The unit 256 may include an interference cancellation unit 260 to combat the effects of such interference.

Figure 2D:
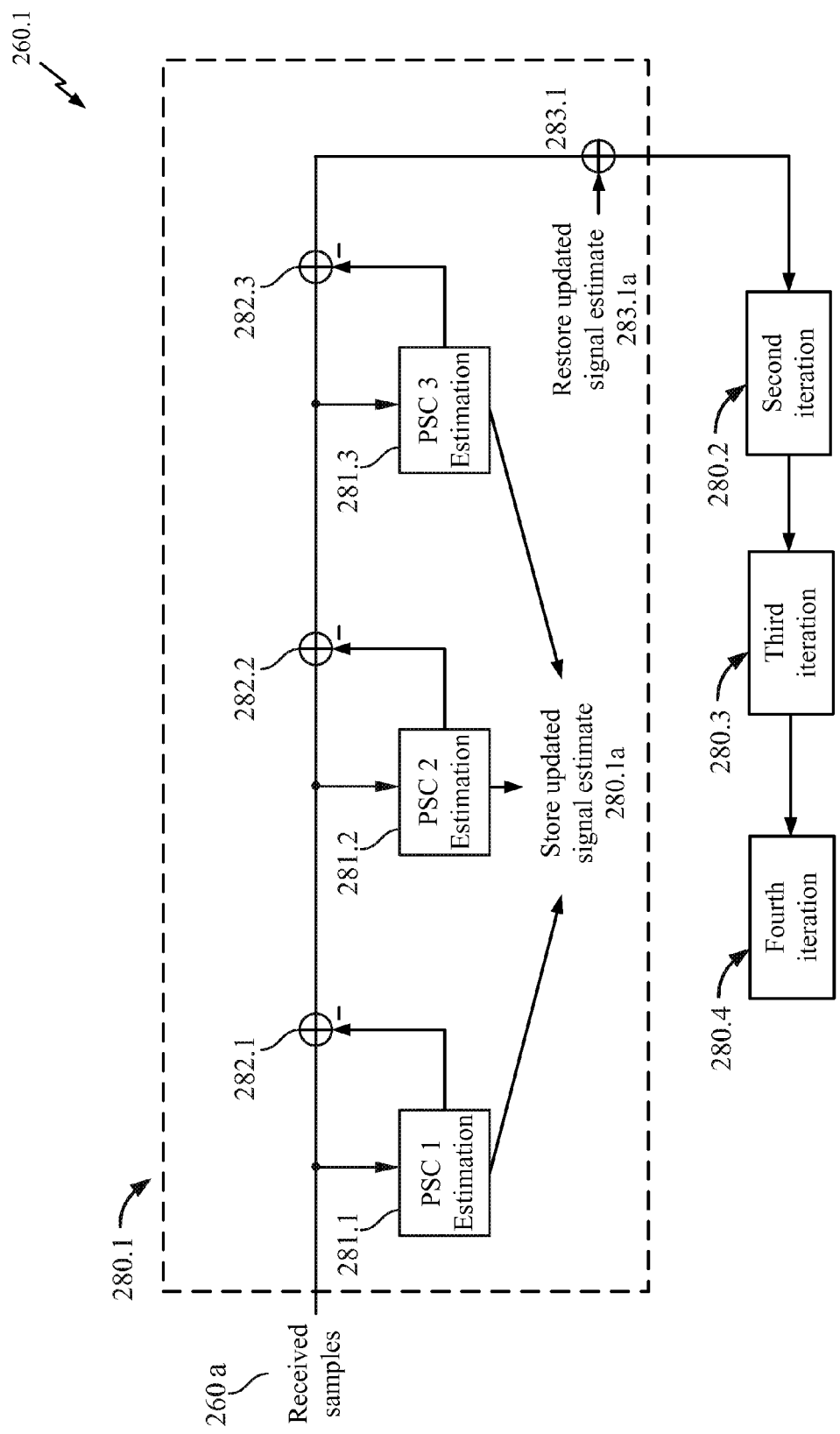
FIG. 2D illustrates an implementation of an interference cancellation scheme for the unit.

FIG. 2D illustrates an implementation 260.1 of an interference cancellation scheme for the unit 260. It will be appreciated that FIG. 2D is shown for illustrative purposes only, and is not meant to limit the scope of the present disclosure.

In FIG. 2D, the unit 260.1 processes received samples 260*a* to remove the interference present in those samples. In an implementation, the samples 260*a* may be derived from the baseband samples 254*a* output by the radio processing unit 254. The samples 260*a* are provided to a first iteration interference cancellation unit 280.1. Unit 280.1 includes a PSC 1 estimation unit 281.1, which estimates the contribution to the received samples 260*a* from the code channels scrambled using PSC 1. For example, in an implementation, the unit 281.1 may estimate samples corresponding to a common pilot channel (or CPICH) in the received samples given knowledge of the scrambling code PSC 1 and the channelization code for the CPICH. Similarly, samples corresponding to other (e.g., dedicated) channels scrambled by PSC 1 may also be estimated. For example, descrambling and de-spreading may be performed for any of the channels scrambled by PSC 1, an estimate may be obtained of the symbols transmitted on those channels, and the symbols may be re-scrambled and re-spread to reconstruct their contribution to the samples 260*a*. In an implementation, the process of estimation may include filtering, equalization, and other techniques known in the art to improve the quality of estimation. Unit 281.1 outputs the sum of the estimated samples corresponding to the code channels for PSC 1, and the sum is subsequently cancelled from the received samples 260*a* using subtraction unit 282.1.

The output of unit 282.1 is further provided to a PSC 2 estimation unit 281.2, which estimates the contribution to the output of unit 282.1 from the code channels scrambled using PSC 2 (or the "second PSC channel set"). The output of unit 281.2 is provided to a subtraction unit 282.2, whose output is further coupled to a PSC 3 estimation unit 281.3 (for estimating a "third PSC channel set") and a subtraction unit 282.3. While estimation and cancellation of channels from three stations are illustrated in FIG. 2D, it will be appreciated that estimation and cancellation of any number of stations may be accommodated using the techniques described.

Note during the interference cancellation, a running or updated estimate of samples corresponding to a desired channel of interest, e.g., a channel dedicated to the desired user's data, as computed by any or all of estimation units 281.1, 281.2, and 281.3, may be stored in a memory (e.g., a sample RAM), as shown at 280.1*a*. For example, assuming the desired user's channel is scrambled by PSC 1, the estimated samples corresponding to that user's channel may be stored in a memory while unit 281.1 is performing estimation. Alternatively, if the desired user's channel is scrambled by PSC 1, PSC 2, and PSC 3 (e.g., the desired user is in soft hand-off communicating with three stations), then the estimated samples corresponding to that user's channel may be stored in a memory while units 281.1, 281.2, and 281.3 are performing estimation. After interference cancellation of channels scrambled by PSC 1, PSC 2, and PSC 3 has been performed by units 282.1, 282.2, and 282.3, respectively, the desired user's samples stored in memory may be added back to the signal stream at 283.1 as shown at 283.1*a*.

Following the first iteration 280.1, further iterations of the interference cancellation may optionally proceed. For example, a second iteration of interference cancellation may proceed at unit 280.2. It will be appreciated that the operations performed at unit 280.2 (not shown) during the second iteration may correspond to similar operations performed at unit 280.1 during the first iteration. Corresponding operations may be performed during subsequent iterations 280.3, 280.4, and four total iterations are shown in FIG. 2D.

It will be appreciated that the cancellation scheme shown in FIG. 2D may be termed successive interference cancellation (SIC), i.e., the cancellation of the contributions from individual stations is performed in series, and multiple iterations of SIC may be further performed in series to further improve the interference cancellation. It will be appreciated that subsequent iterations may benefit from the cancellation already performed for the first iteration, as signal estimation performed during the second iteration may benefit from the interference cancellation performed during the first iteration.

For simplicity, the interference cancellation scheme shown in FIG. 2D performs cancellation on received signals from three stations (e.g., base stations). One of ordinary skill in the art will appreciate that the techniques may be readily applied to cancel interference from fewer or more than three stations. In an exemplary embodiment, the three stations chosen may correspond to the three stations having the highest received signal strengths from among all stations. In an exemplary embodiment, PSC 1 may correspond to the PSC of the station having the highest received signal strength, PSC 2 may correspond to the PSC of the station having the second highest received signal strength, and PSC 3 may correspond to the PSC of the station having the third highest received signal strength. Thus the cancellation may generally proceed by cancelling the strongest interferers first.

It will be appreciated that the restoring the desired user's samples from memory may be performed alternatively from the manner shown in FIG. 2D. For example, the desired user's samples stored in memory from estimation units 281.1, 281.2, and 281.3 need not be simultaneously added back to the signal stream at 283.1. If estimated samples provided by estimation unit 281.2 are stored in memory during the first iteration 280.1, then restoration (i.e., addition) of those samples back to the signal stream may be delayed until just prior to the next instance of estimation unit 281.2 during the second iteration 280.2, etc. It will be appreciated that the storing of estimated samples in memory and their restoration into the signal stream for successive interference cancellation are known in the art, and alternative exemplary embodiments to those explicitly shown herein are contemplated to be within the scope of the present disclosure.

It will be further appreciated that alternative SIC schemes known in the art may adopt different architectures from the one shown in FIG. 2D. The techniques disclosed herein may be readily applied to such alternative SIC schemes, and such alternative exemplary embodiments are contemplated to be within the scope of the present disclosure. Techniques for interference cancellation are further described in U.S. patent application Ser. No. 11/560,060, entitled "Iterative Detection and Cancellation for Wireless Communication," and U.S. patent application Ser. No. 11/560,206, entitled "Successive Equalization and Cancellation and Successive Mini Multi-User Detection for Wireless Communication," earlier referenced herein.

It will be appreciated that according to the channelization and scrambling scheme illustrated in FIG. 2B, a plurality L of channels 230.1a through 230.1L may be accommodated by a single station 210.1 by providing a plurality L of channelization codes $C_1$ through $C_L$ that are orthogonal to each other. For example, there may be a maximum number L of channelization codes assigned to each PSC. In some systems, it may be desirable to increase the number of channels supported by a station to beyond such a maximum, thereby potentially increasing the number of supported users. This may be accomplished by introducing one or more secondary scrambling codes (SSC's) to support additional channels and/or users. (See, e.g., "Modulation and spreading," 3GPP TS 25.213 V5.6.0 (2005-06).)

Figure 3:
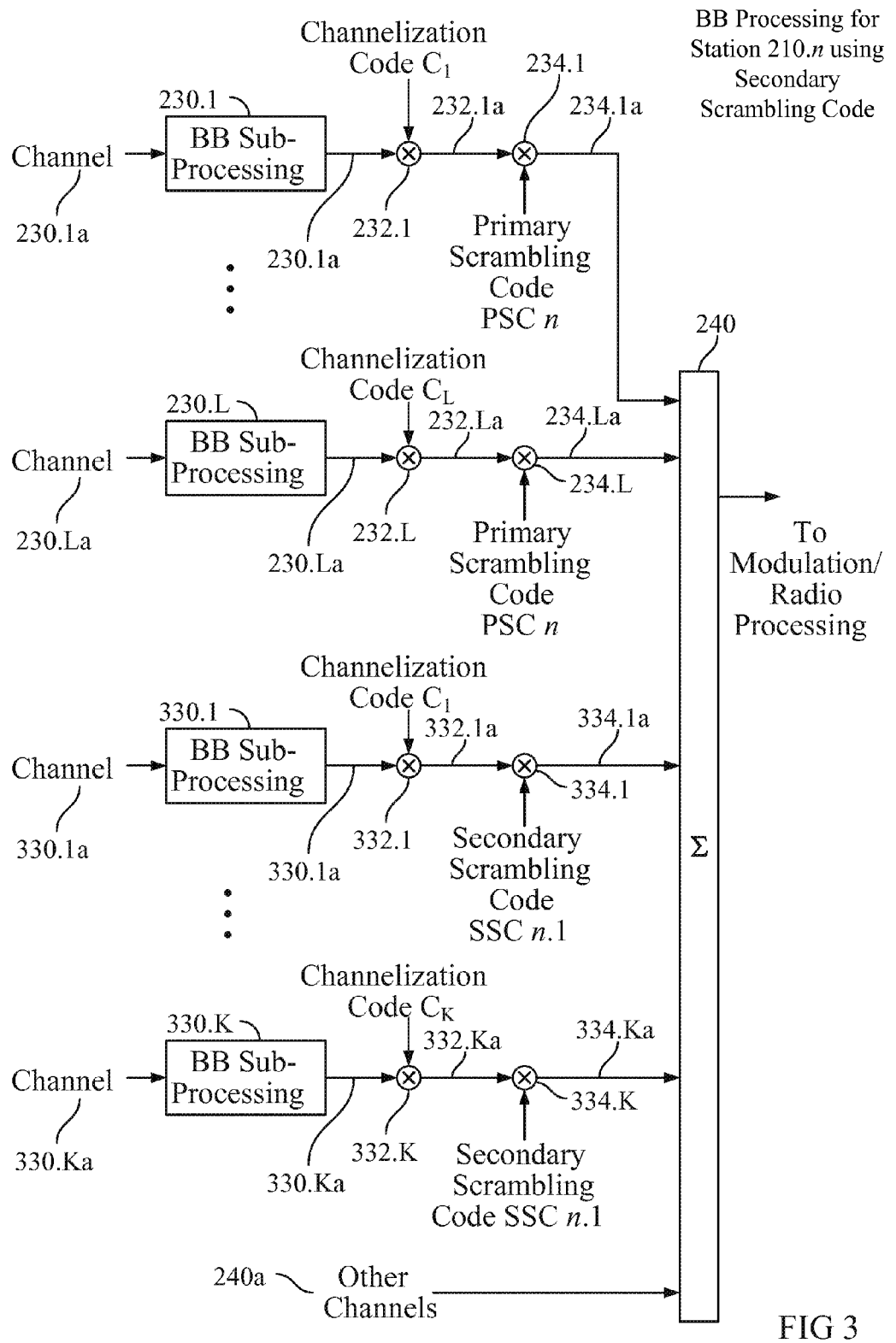
FIG. 3 illustrates an exemplary embodiment of baseband processing for an arbitrary station that utilizes a secondary scrambling code in addition to the primary scrambling code to accommodate additional channels.

FIG. 3 illustrates an exemplary embodiment of baseband processing for an arbitrary station 210.n that utilizes a secondary scrambling code in addition to the primary scrambling code to accommodate additional channels.

In FIG. 3, a plurality K of channels 330.1a through 330.Ka (or a "first SSC channel set") is provided, along with the plurality L of channels 230.1a through 230.La previously described with reference to FIG. 2B. Referring to channel 330.1a, data for channel 330.1a is provided to a baseband sub-processing unit 330.1, whose output is multiplied with a channelization code $C_1$ using a multiplier 332.1 to generate a signal 332.1a. Following channelization, the signal 332.1a is multiplied with a secondary scrambling code (SSC) SSC n.1 to generate a signal 334.1a. Corresponding operations may be performed for each of the other channels to generate the plurality of signals 334.1a through 334.Ka. The signals 334.1a through 334.Ka, signals 234.1a through 234.La, and other channel signals 240a are provided to the summer 240.

In an implementation, each of the channels 330.1a through 330.Ka is scrambled using the same secondary scrambling code SSC n. 1. In W-CDMA, a single station 210.n may be assigned one PSC and one or more SSC's (one of which is shown in FIG. 3). It will be appreciated that when an SSC is used, the code channels generated by a single station 210.n may no longer be orthogonal to each other. For example, if the same channelization code C1 is employed to channelize the data on both channels 230.1a and 330.1a, with 230.1a being scrambled by a PSC and 330.1a being scrambled by an SSC, then the resulting scrambled sequences are generally not orthogonal to each other, as the PSC and SSC may generally have some finite cross-correlation. Therefore, a receiver will see interference from other channels transmitted by the station serving it (i.e., intra-cell interference), in addition to interference from other stations (i.e., inter-cell interference).

Note while a single SSC n.1 is shown accommodated in FIG. 3, alternative exemplary embodiments may accommodate even more SSC's, e.g., SSC n.2, SSC n.3, etc., to further increase the number of supported channels. Such alternative exemplary embodiments are contemplated to be within the scope of the present disclosure.

It will be appreciated that while the non-orthogonal channel code sets may be referred to herein as, e.g., codes scrambled using a "primary" versus a "secondary" scrambling code, it will be appreciated that alternative exemplary embodiments may employ different names for non-orthogonal channel sets. For example, in a cdma2000 system, non-orthogonal channelization codes may be referred to as "quasi-orthogonal functions" (QOF's). In this specification and in the claims, the terms "primary scrambling code" and "secondary scrambling code" are not meant to be restricted to only applications of the present disclosure to W-CDMA, but are meant to encompass any exemplary embodiment wherein two or more non-orthogonal channel code sets are employed. Such alternative exemplary embodiments are contemplated to be within the scope of the present disclosure.

Figure 4:
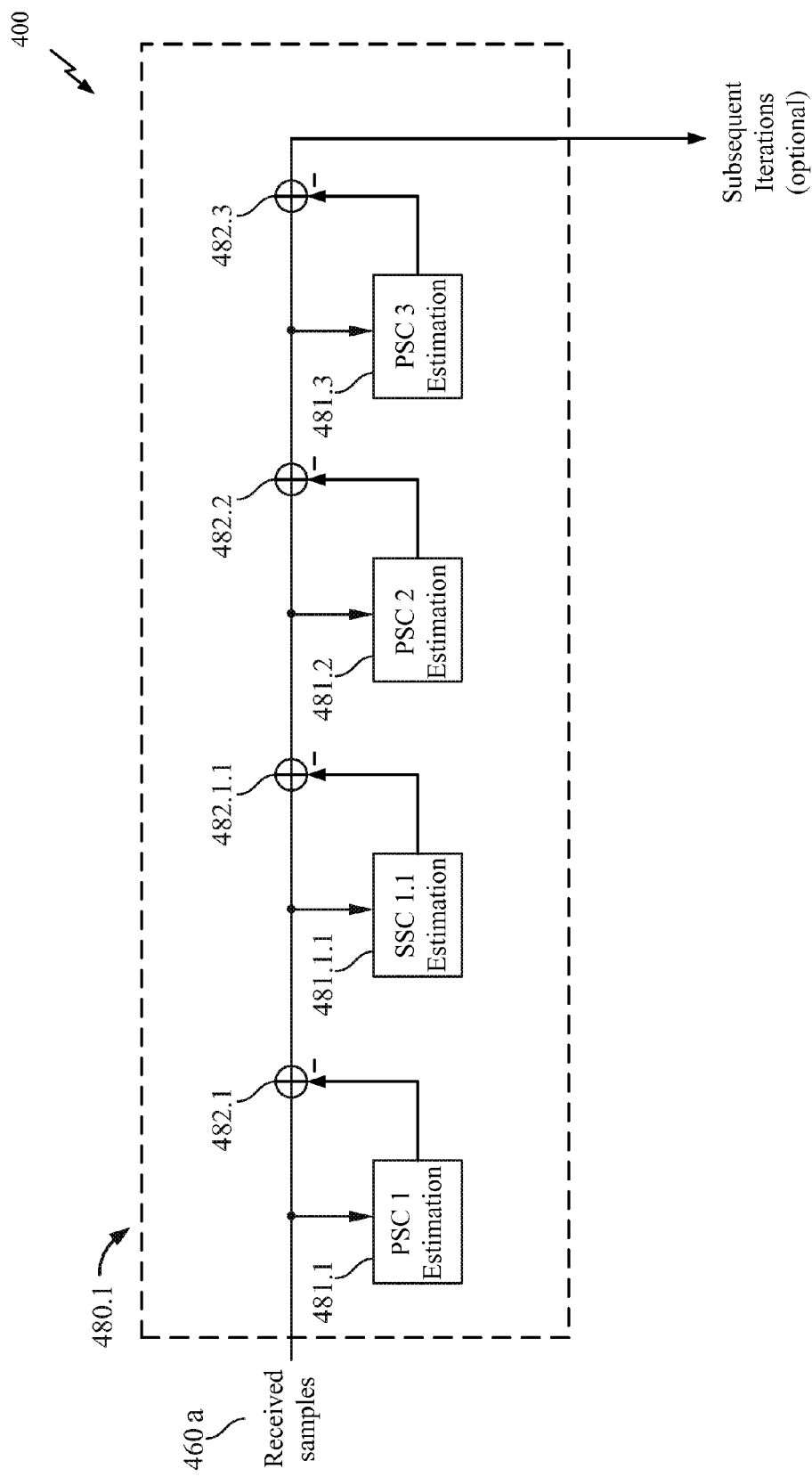
FIG. 4 illustrates an exemplary embodiment of an interference cancellation scheme at a receiver for processing a composite signal wherein a secondary scrambling code (SSC) is used.

FIG. 4 illustrates an exemplary embodiment 400 of an interference cancellation scheme at a receiver for processing a composite signal wherein a secondary scrambling code (SSC) is used. The scheme 400 may be adopted e.g., in an interference cancellation unit 260 for a receiver 250 as earlier described herein with reference to FIG. 2C. For ease of illustration, the storing of estimated samples in memory and their restoration into the signal stream, e.g., as shown at 280.1a and 283.1a in FIG. 2D, have been omitted from FIGS. 4, 4A, and 5 herein.

In FIG. 4, the unit 400 processes received samples 460a to remove the interference present in those samples. In an implementation, the samples 460a may be derived from baseband samples 254a output by the radio processing unit 254, wherein the composite signal 225a received by the radio processing unit 254 contains one or more signals scrambled using an SSC. The samples 460a are provided to a first iteration interference cancellation unit 480.1. Unit 480.1 includes a PSC 1 estimation unit 481.1, which computes an estimate of the contribution to the received samples 460a from the code channels scrambled using PSC 1. Unit 481.1 outputs the sum of the estimated samples corresponding to the code channels for PSC 1, and the sum is subsequently cancelled from the received samples 460a using subtraction unit 482.1.

The output of unit 482.1 is further provided to an SSC 1.1 estimation unit 481.1.1. The unit 481.1.1 computes an estimate of the contribution to the output of unit 482.1 from the code channels scrambled using SSC 1.1. Unit 481.1.1 outputs the sum of the estimated samples corresponding to the code channels for SSC 1.1, and the sum is subsequently cancelled from the output of unit 482.1 using subtraction unit 482.1.1. The output of unit 482.1.1 is further provided to units 481.2, 482.2, 481.3, and 482.3 for estimation and cancellation of PSC2 and PSC3 channels, in accordance with the techniques earlier described herein. Furthermore, subsequent iterations may be performed according to SIC techniques as described hereinabove with reference to FIG. 2D.

It will be appreciated that the cancellation scheme shown in FIG. 4 effectively processes the cancellation of SSC 1.1 channel set in the same manner as the cancellation of the PSC channel sets. Note that as the additional estimation and cancellation for the additional SSC 1.1 channels requires correspondingly more computational bandwidth relative to, e.g., the unit 260.1, the total number of iterations performed by the unit 400 may be correspondingly reduced. In an exemplary embodiment, three iterations may be performed by the unit 400.

For simplicity, the interference cancellation scheme shown in FIG. 4 cancels interference from signals scrambled using a single SSC and three PSC's. In an exemplary embodiment, the single SSC channel set cancelled may correspond to the SSC used by the station serving the receiver performing the interference cancellation, i.e., SSC channel sets from other stations may be ignored in the interference cancellation process. Furthermore, one of ordinary skill in the art will appreciate that the techniques may be readily applied to cancel interference from fewer or more SSC's and/or PSC's than those explicitly shown.

In an exemplary embodiment of the present disclosure, to aid a receiver in estimating the noise power present on an SSC channel set, one or more of the channels in the SSC channel set may be transmitted with no TX power. For example, one of the channels 330.1a through 330.Ka in FIG. 3 may be transmitted with no power to allow the receiver to estimate noise power associated with the SSC channel set. It will be appreciated that such noise power estimates may be used, e.g., in certain equalization schemes such as MMSE equalization in estimation as performed by, e.g., unit 481.1.1 in FIG. 4.

Figure 4A:
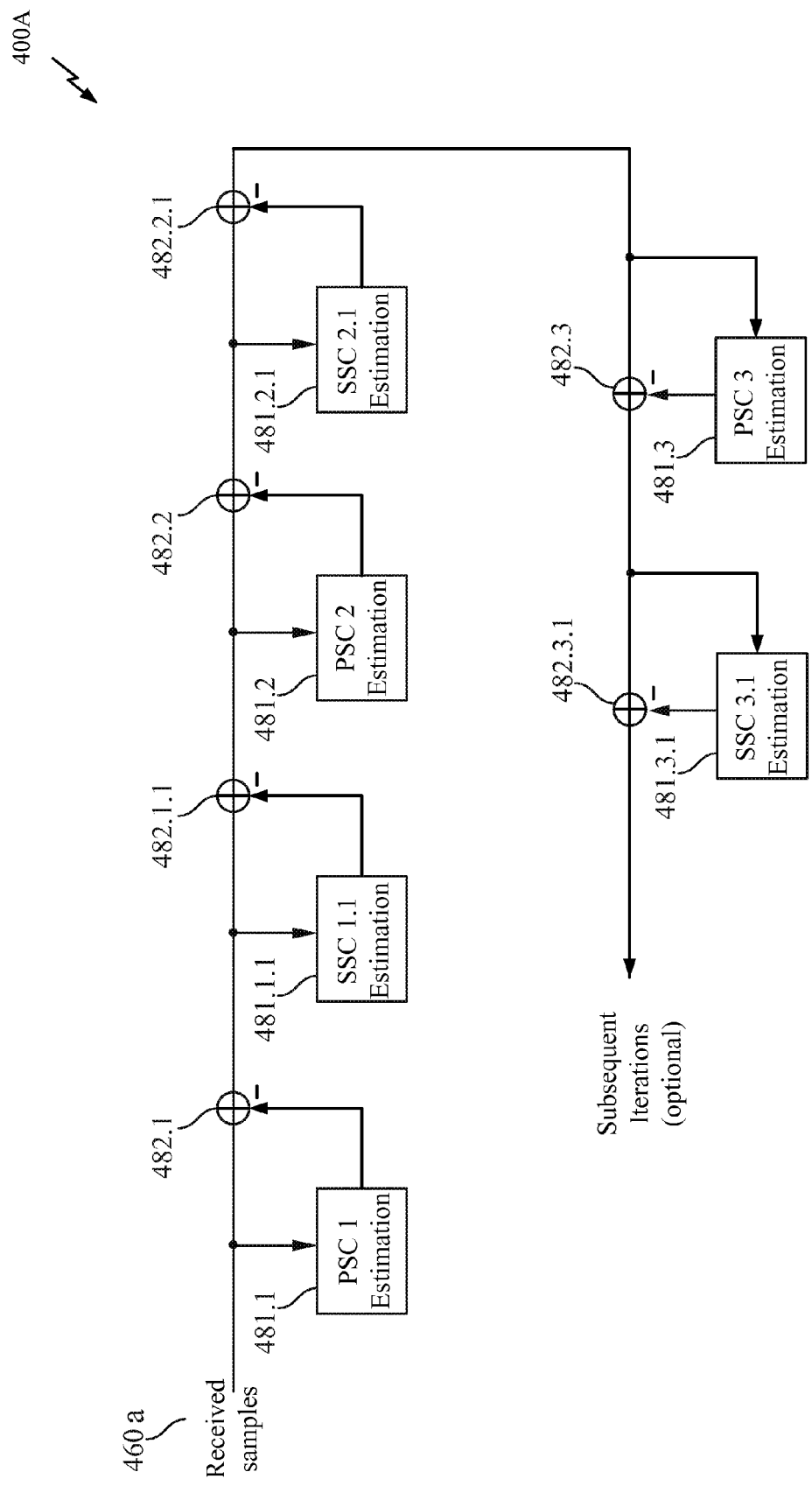
FIG. 4A illustrates an exemplary embodiment of a generalized scheme for cancelling interference from stations collectively utilizing multiple secondary scrambling codes.

FIG. 4A illustrates an exemplary embodiment 400A of a generalized scheme for cancelling interference from stations collectively utilizing multiple secondary scrambling codes.

In FIG. 4A, in addition to the units described with reference to FIG. 4, estimation and cancellation units 481.2.1, 482.2.1, 481.3.1, and 482.3.1 are provided for channels scrambled using SSC 2.1 and SSC 3.1. The operation of these units will be clear to one of ordinary skill in the art in light of the present disclosure. In the exemplary embodiment shown, estimation and cancellation of channels scrambled using an SSC is performed immediately after estimation and cancellation of channels scrambled using a PSC for the same station is performed. In alternative exemplary embodiments, the sequencing of the estimation and cancellation may be alternatively performed. In an exemplary embodiment, as the computational bandwidth of the scheme 400A may be higher compared to, e.g., the scheme 260.1 shown in FIG. 2D, two iterations may be performed by the scheme 400A.

It will be appreciated that the schemes shown in FIGS. 4 and 4A may be readily modified to accommodate an arbitrary number of interference cancellation units for an arbitrary number of PSC's and SSC's, and such alternative exemplary embodiments are contemplated to be within the scope of the present disclosure.

Figure 5:
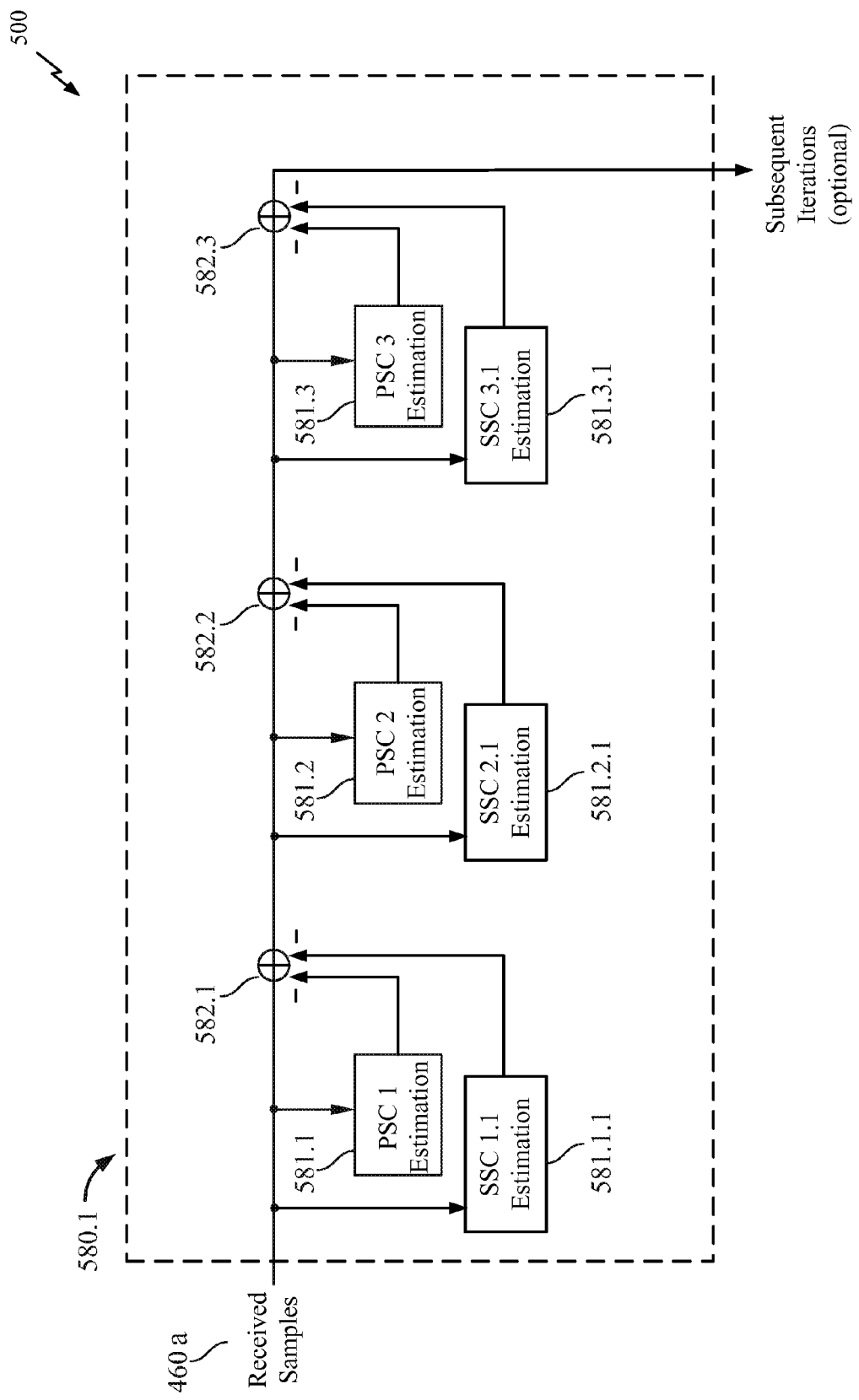
FIG. 5 illustrates an alternative exemplary embodiment of an interference cancellation scheme for processing a composite signal wherein one or more secondary scrambling codes are used.

FIG. 5 illustrates an alternative exemplary embodiment 500 of an interference cancellation scheme for processing a composite signal wherein one or more secondary scrambling codes are used. The scheme 500 processes received samples 460a to remove the interference present in those samples. A PSC 1 estimation unit 581.1 estimates the contribution to the received samples 460a from the PSC 1 channel set. A SSC 1.1 estimation unit 581.1.1 estimates the contribution to the received samples 460a from the SSC 1.1 channel set. Units 581.1 and 581.1.1 output their estimates of the PSC 1 and SSC 1.1 channel sets, and the estimates are subsequently cancelled from the received samples 460a using subtraction unit 582.1.

It will be appreciated that as units 581.1 and 581.1.1 effectively perform their computations in parallel (as opposed to in series), the estimation of the SSC 1.1 channel set does not benefit from prior cancellation of the PSC 1 channel set, and vice versa. However, it will be appreciated that the time required for parallel computations may be reduced compared to the time required for serial computations.

Further shown in FIG. 5 are PSC 2 estimation unit 581.2, SSC 2.1 estimation unit 581.2.1, cancellation unit 582.2, PSC 3 estimation unit 581.3, SSC 3.1 estimation unit 581.3.1, and cancellation unit 582.3. These units are also coupled such that the estimation of a PSC channel is performed in parallel with the estimation of a corresponding SSC channel, and their operation will be clear to one of ordinary skill in the art in light of the principles earlier described herein.

It will be appreciated that various modifications to the SSC interference cancellation techniques of FIG. 5 are possible within the scope of the present disclosure. For example, an SSC channel need not be cancelled in parallel with the PSC channels transmitted from the same station. Furthermore, more than channels of more than two scrambling codes may be cancelled in parallel at any stage, e.g., a PSC channel set from a first station may be cancelled with first and second (or more) SSC channel sets from the first station, wherein two or more SSC's are used for the first station.

Figure 6:
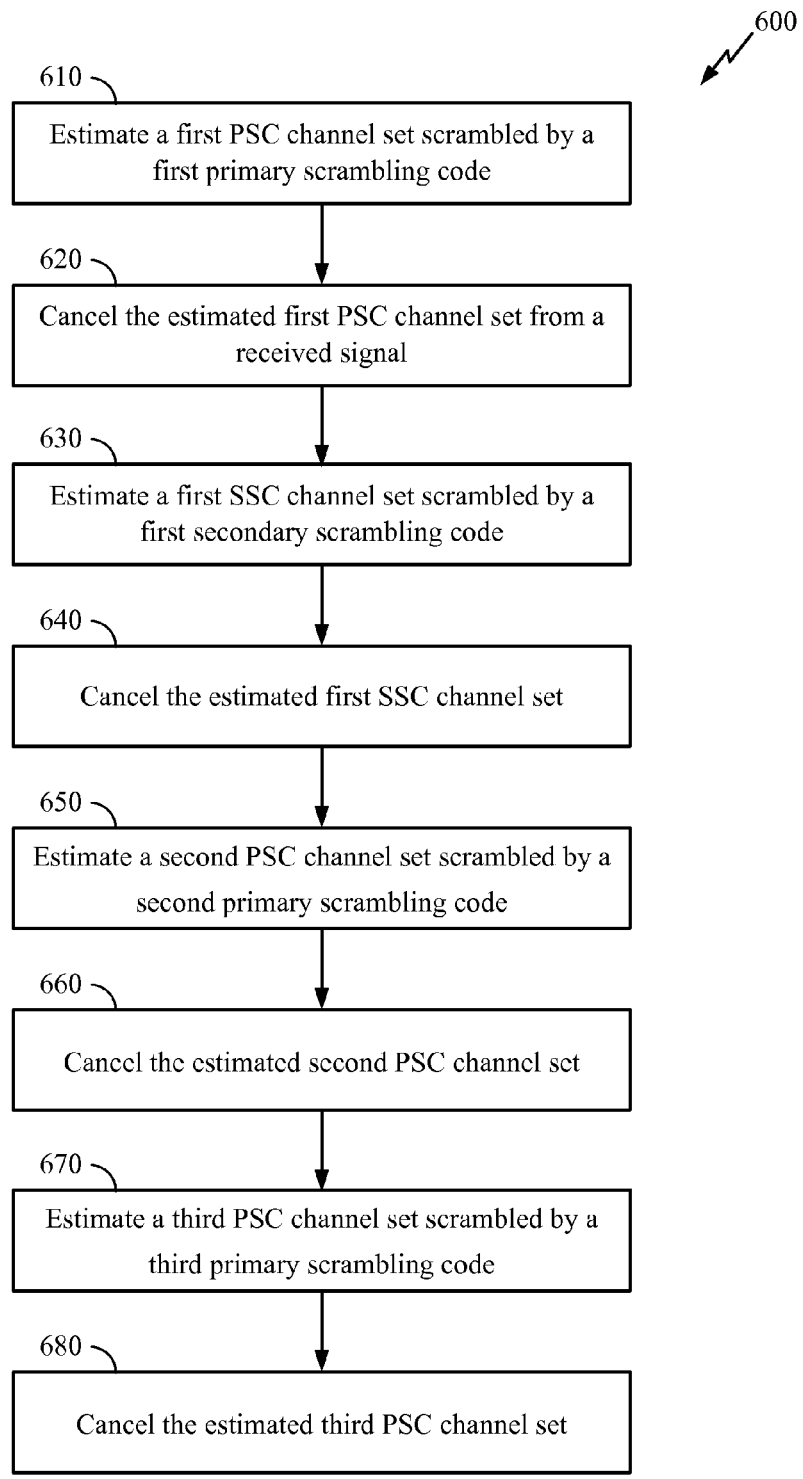
FIG. 6 illustrates an exemplary embodiment of a method according to the present disclosure.

FIG. 6 illustrates an exemplary embodiment of a method 600 according to the present disclosure.

In FIG. 6, block 610 includes estimating a first PSC channel set scrambled by a first primary scrambling code.

Block 620 includes cancelling the estimated first PSC channel set from a received signal.

Block 630 includes estimating a first SSC channel set scrambled by a first secondary scrambling code, the first SSC channel set being non-orthogonal to the first PSC channel set, the first PSC and SSC channel sets being transmitted from a single station.

Block 640 includes cancelling the estimated first SSC channel set.

Block 650 includes estimating a second PSC channel set scrambled by a second primary scrambling code.

Block 660 includes cancelling the estimated second PSC channel set.

Block 670 includes estimating a third PSC channel set scrambled by a third primary scrambling code.

Block 680 includes cancelling the estimated third PSC channel set.

Further described herein with reference to FIGS. 7A-7D is an example radio network operating according to UMTS in which the principles of the present disclosure may be applied. Note FIGS. 7A-7D are shown for illustrative background purposes only, and are not meant to limit the scope of the present disclosure to radio networks operating according to UMTS.

Figure 7A:
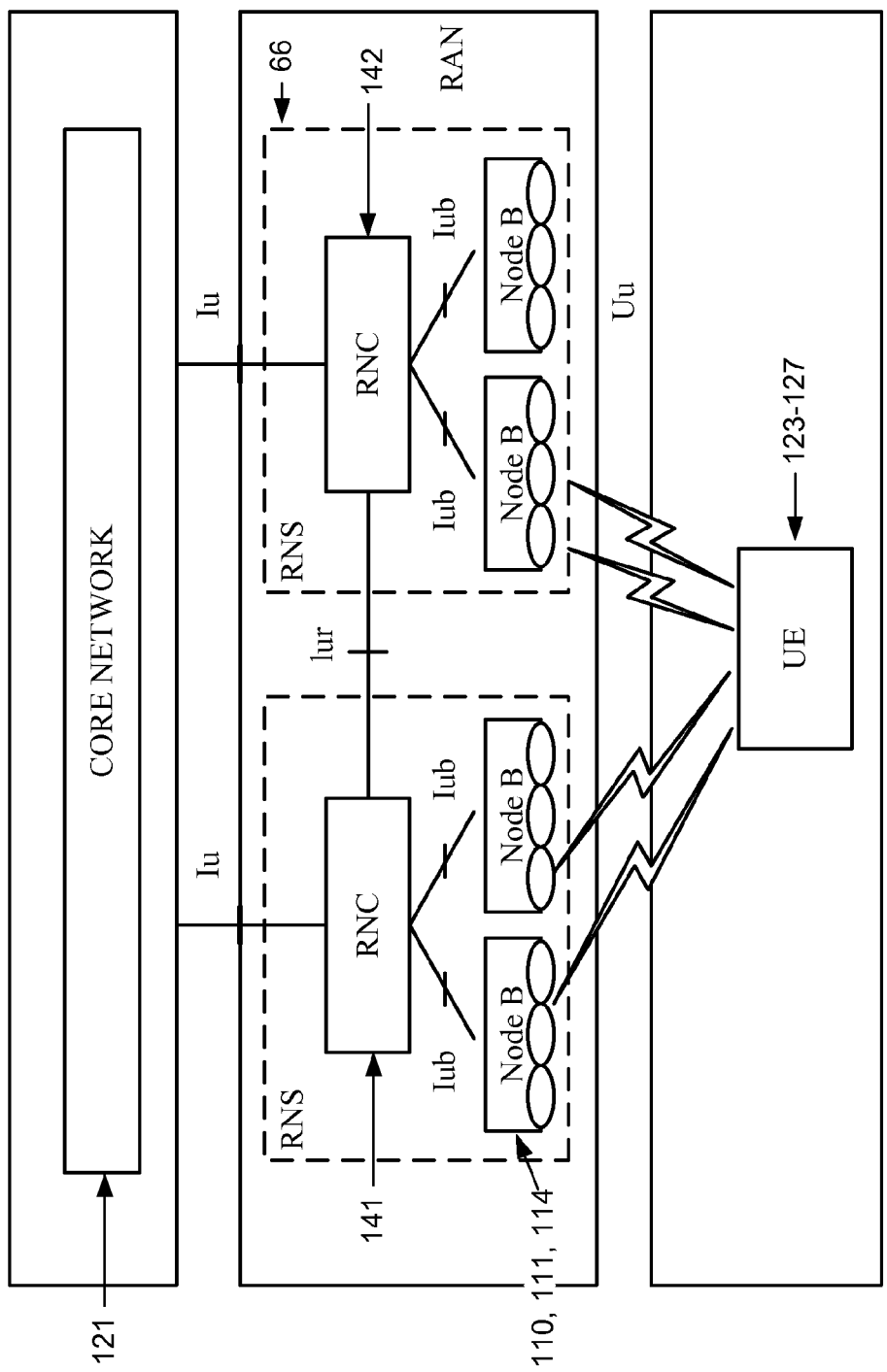
FIGS. 7A-7D describe an example radio network operating according to UMTS in which the principles of the present disclosure may be applied.

FIG. 7A illustrates an example of a radio network. In FIG. 7A, Node Bs 110, 111, 114 and radio network controllers 141-144 are parts of a network called "radio network," "RN," "access network," or "AN." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit-switched and IP-based packet-switched traffic types. The UTRAN provides an air interface access method for the user equipment (UE) 123-127. Connectivity is provided between the UE and the core network by the UTRAN. The radio network may transport data packets between multiple user equipment devices 123-127.

The UTRAN is connected internally or externally to other functional entities by four interfaces: Iu, Uu, Iub and Iur. The UTRAN is attached to a GSM core network 121 via an external interface called Iu. Radio network controllers (RNC's) 141-144 (shown in FIG. 7B), of which 141, 142 are shown in FIG. 7A, support this interface. In addition, the RNC manages a set of base stations called Node Bs through interfaces labeled Iub. The Iur interface connects two RNCs 141, 142 with each other. The UTRAN is largely autonomous from the core network 121 since the RNCs 141-144 are interconnected by the Iur interface. FIG. 7A discloses a communication system which uses the RNC, the Node Bs and the Iu and Uu interfaces. The Uu is also external and connects the Node B with the UE, while the Iub is an internal interface connecting the RNC with the Node B.

The radio network may be further connected to additional networks outside the radio network, such as a corporate intranet, the Internet, or a conventional public switched telephone network as stated above, and may transport data packets between each user equipment device 123-127 and such outside networks.

Figure 7B:
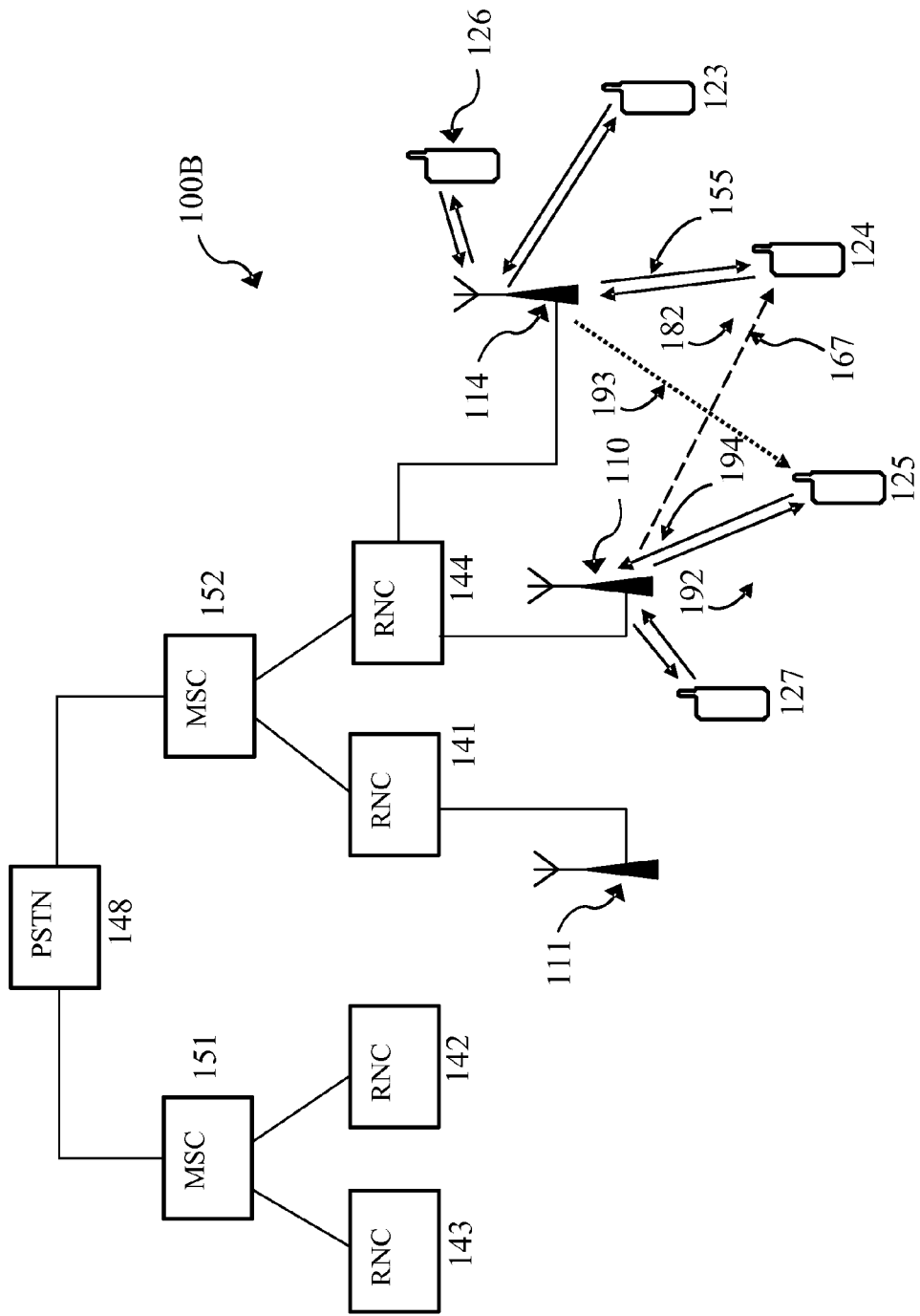

FIG. 7B illustrates selected components of a communication network 100B, which includes a radio network controller (RNC) (or base station controller (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. The RNC 141-144 provides control functionalities for one or more Node Bs. The radio network controller 141-144 is coupled to a public switched telephone network (PSTN) 148 through a mobile switching center (MSC) 151, 152. In another example, the radio network controller 141-144 is coupled to a packet switched network (PSN) (not shown) through a packet data server node ("PDSN") (not shown). Data interchange between various network elements, such as the radio network controller 141-144 and a packet data server node, can be implemented using any number of protocols, for example, the Internet Protocol ("IP"), an asynchronous transfer mode ("ATM") protocol, T1, E1, frame relay, and other protocols.

The RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. It is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable Uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels, as will be appreciated by one skilled in the art. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. A period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses 3 enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI. As has already been mentioned, for each TTI the control information indicates to the user equipment device 123-127 which codes within the code space will be used to send downlink payload data (data other than control data of the radio network) to the device, and the modulation that will be used for transmission of the downlink payload data.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone.

The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. User equipment 123-127 may be any data device that communicates through a wireless channel or through a wired channel, for example using fiber optic or coaxial cables. The communication link through which the user equipment 123-127 sends signals to the Node B 110, 111, 114 is called an uplink. The communication link through which a NodeB 110, 111, 114 sends signals to a user equipment 123-127 is called a downlink.

Figure 7C:
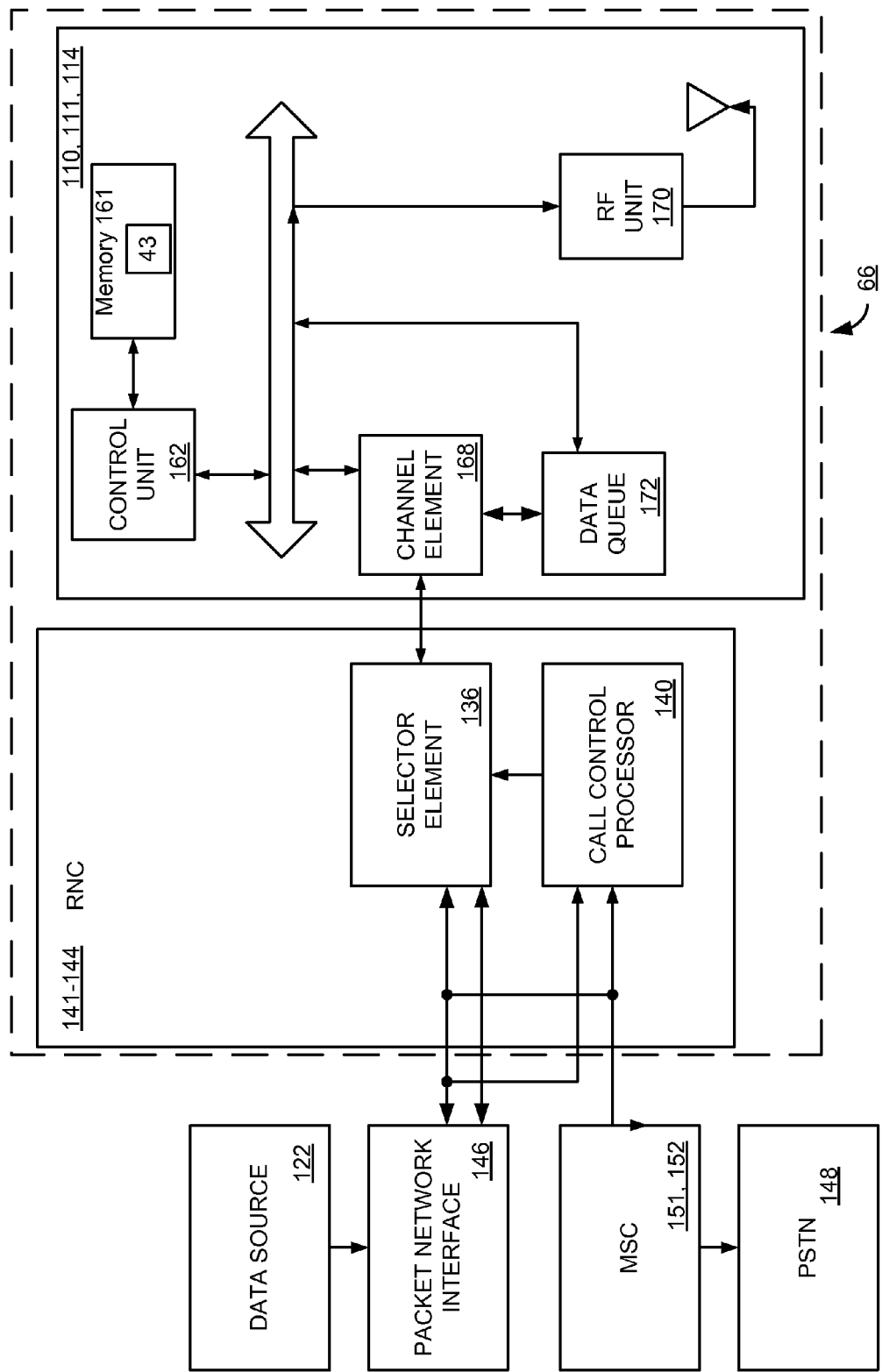

FIG. 7C is detailed herein below, wherein specifically, a Node B 110, 111, 114 and radio network controller 141-144 interface with a packet network interface 146. (Note in FIG. 7C, only one Node B 110, 111, 114 is shown for simplicity.) The Node B 110, 111, 114 and radio network controller 141-144 may be part of a radio network server (RNS) 66, shown in FIG. 7A and in FIG. 7C as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 (not shown in FIG. 7C) associated with the data queue 172.

Radio network controller 141-144 interfaces with a Public Switched Telephone Network (PSTN) 148 through a mobile switching center 151, 152. Also, radio network controller 141-144 interfaces with Node Bs 110, 111, 114 in the communication system 100B. In addition, radio network controller 141-144 interfaces with a Packet Network Interface 146. Radio network controller 141-144 coordinates the communication between user equipment 123-127 in the communication system and other users connected to a packet network interface 146 and PSTN 148. PSTN 148 interfaces with users through a standard telephone network (not shown in FIG. 7C).

Radio network controller 141-144 contains many selector elements 136, although only one is shown in FIG. 7C for simplicity. Each selector element 136 is assigned to control communication between one or more Node B's 110, 111, 114 and one remote station 123-127 (not shown). If selector element 136 has not been assigned to a given user equipment 123-127, call control processor 140 is informed of the need to page the user equipment 123-127. Call control processor 140 then directs Node B 110, 111, 114 to page the user equipment 123-127.

Data source 122 contains a quantity of data, which is to be transmitted to a given user equipment 123-127. Data source 122 provides the data to packet network interface 146. Packet network interface 146 receives the data and routes the data to the selector element 136. Selector element 136 then transmits the data to Node B 110, 111, 114 in communication with the target user equipment 123-127. In the exemplary embodiment, each Node B 110, 111, 114 maintains a data queue 172, which stores the data to be transmitted to the user equipment 123-127.

For each data packet, channel element 168 inserts the control fields. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator where it is despread with the short PNI and PNQ codes and decovered with the Walsh cover. The demodulated data is provided to a decoder which performs the inverse of the signal processing functions done at Node B 110, 111, 114, specifically the de-interleaving, decoding, and CRC check functions. The decoded data is provided to a data sink.

Figure 7D:
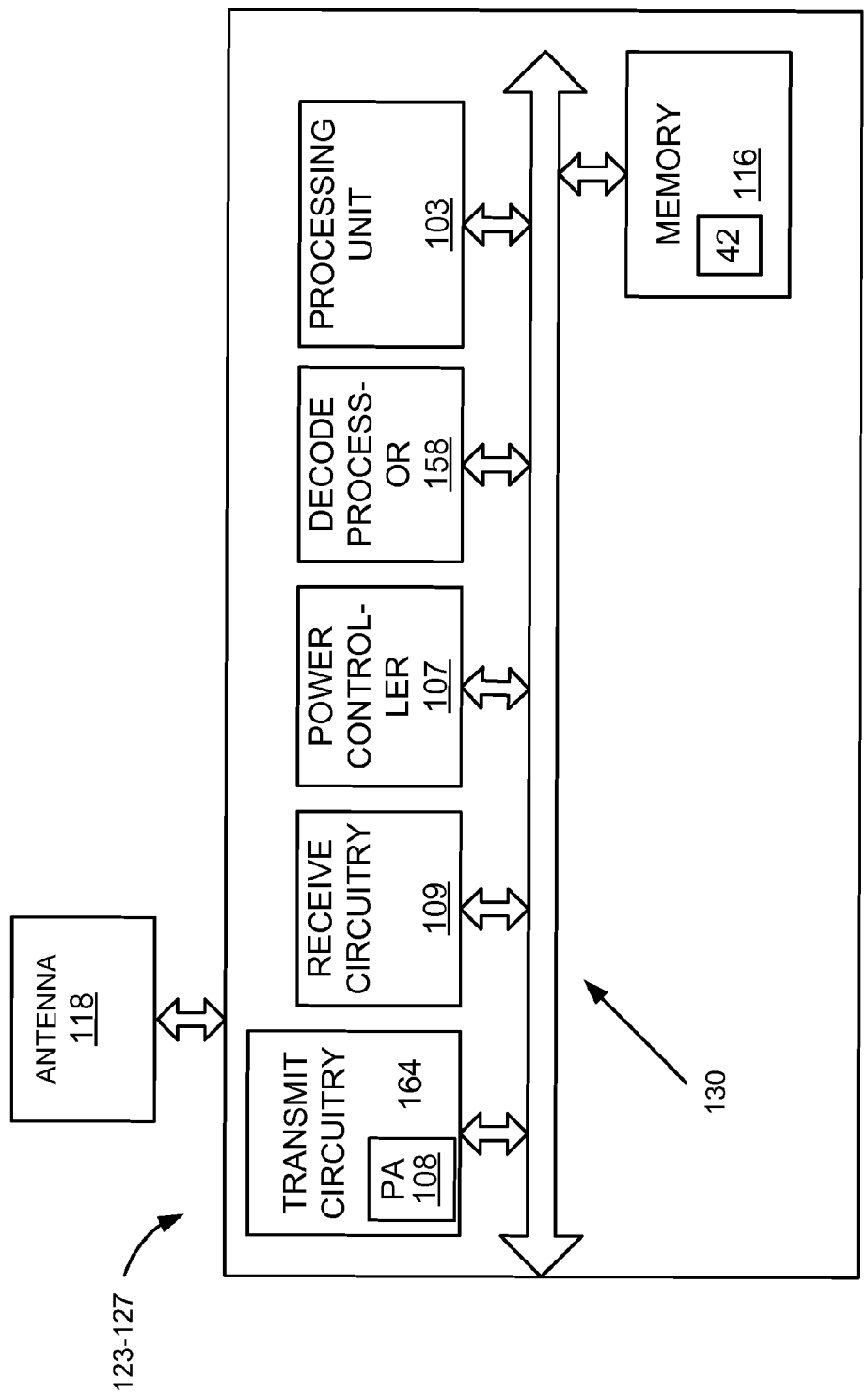

FIG. 7D illustrates an embodiment of a user equipment (UE) 123-127 in which the UE 123-127 includes transmit circuitry 164 (including PA 108), receive circuitry 109, power controller 107, decode processor 158, processing unit 103, and memory 116.

The processing unit 103 controls operation of the UE 123-127. The processing unit 103 may also be referred to as a CPU. Memory 116, which may include both read-only memory (ROM) and random access memory (RAM), provides instructions and data to the processing unit 103. A portion of the memory 116 may also include non-volatile random access memory (NVRAM).

The UE 123-127, which may be embodied in a wireless communication device such as a cellular telephone, may also include a housing that contains a transmit circuitry 164 and a receive circuitry 109 to allow transmission and reception of data, such as audio communications, between the UE 123-127 and a remote location. The transmit circuitry 164 and receive circuitry 109 may be coupled to an antenna 118.

The various components of the UE 123-127 are coupled together by a bus system 130 which may include a power bus, a control signal bus, and a status signal bus in addition to a data bus. However, for the sake of clarity, the various busses are illustrated in FIG. 7D as the bus system 130. The UE 123-127 may also include a processing unit 103 for use in processing signals. Also shown are a power controller 107, a decode processor 158, and a power amplifier 108.

The steps of the methods discussed may also be stored as instructions in the form of software or firmware 43 located in memory 161 in the Node B 110, 111, 114, as shown in FIG. 7C. These instructions may be executed by the control unit 162 of the Node B 110, 111, 114 in FIG. 7C. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 7D.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method comprising:
estimating (610) a first PSC channel set scrambled by a first primary scrambling code;
cancelling (620) the estimated first PSC channel set from a received signal;
estimating (630) a first SSC channel set scrambled by a first secondary scrambling code, the first SSC channel set being non-orthogonal to the first PSC channel set, the first PSC and SSC channel sets being transmitted from a single station, wherein the estimating of the first SSC channel set is done on at least one of the channels in the SSC channel set that is transmitted with no transmit power; and
cancelling (640) the estimated first SSC channel set.

2. The method of claim 1, the first PSC channel set comprising a pilot channel and a dedicated channel.

3. The method of claim 1, the cancelling the estimated first SSC channel set comprising cancelling the estimated first SSC channel set from the result of cancelling the estimated first PSC channel set from the received signal.

4. The method of claim 1, the cancelling the estimated first SSC channel set comprising cancelling the estimated first SSC channel set from the received signal.

5. The method of claim 1, further comprising:
estimating (650) a second PSC channel set scrambled by a second primary scrambling code;
cancelling (660) the estimated second PSC channel set;
estimating (670) a third PSC channel set scrambled by a third primary scrambling code; and
cancelling (680) the estimated third PSC channel set.

6. The method of claim 5, the cancelling the estimated first PSC channel set performed prior to the estimating the second PSC channel set, the cancelling the second PSC channel set performed prior to the estimating the third PSC channel set.

7. The method of claim 6, the first PSC channel set having a highest received signal strength, the second PSC channel set having a second highest received signal strength, the third PSC channel set having a third highest received signal strength.

8. The method of claim 1, the cancelling the first PSC channel set performed prior to the estimating the first SSC channel set, the cancelling the first SSC channel set performed prior to the estimating the second PSC channel set.

9. The method of claim 1, the estimating the first SSC channel set comprising estimating the first SSC channel set from the received signal after the estimated first PSC channel set has been cancelled from the received signal.

10. The method of claim 9, further comprising iterating multiple times (280.1, 280.2, 280.3, 280.4) through the estimating the first PSC channel set, the cancelling the estimated first PSC channel set, the estimating the first SSC channel set, and the cancelling the estimated first SSC channel set.

11. The method of claim 1, further comprising:
estimating (481.2.1) a second SSC channel set scrambled by a second secondary scrambling code;
cancelling (482.2.1) the estimated second SSC channel set;
estimating (481.3.1) a third SSC channel set scrambled by a third secondary scrambling code; and
cancelling (482.3.1) the estimated third SSC channel set.

12. The method of claim 1, the estimating the first SSC channel set comprising estimating a noise power of a zero-power channel scrambled by the first secondary scrambling code.

13. The method of claim 1, the first SSC channel set comprising at least one quasi-orthogonal function.

14. The method of claim 1, the estimating the first PSC channel set comprising de-spreading and de-scrambling at least one channel of the PSC channel set, and equalizing the de-spread and de-scrambled symbols.

15. An apparatus comprising:
a first PSC estimation unit (481.1) configured to estimate a first PSC channel set scrambled by a first primary scrambling code;
a first PSC cancellation unit (482.1) configured to cancel the estimated first PSC channel set from a received signal;
a first SSC estimation unit (481.1.1) configured to estimate a first SSC channel set scrambled by a first secondary scrambling code, the first SSC channel set being non-orthogonal to the first PSC channel set, the first PSC and SSC channel sets being transmitted from a single station, wherein the estimate of the first SSC channel set is done on at least one of the channels in the SSC channel set that is transmitted with no transmit power; and
a first SSC cancellation unit (482.1.1) configured to cancel the estimated first SSC channel set.

16. The apparatus of claim 15, the first PSC channel set comprising a pilot channel and a dedicated channel.

17. The apparatus of claim 15, the first SSC cancellation unit coupled to the output of the first PSC cancellation unit.

18. The apparatus of claim 15, further comprising:
a second PSC estimation unit (481.2) configured to estimate a second PSC channel set scrambled by a second primary scrambling code;
a second PSC cancellation unit (482.2) configured to cancel the estimated second PSC channel set from the received signal;
a third PSC estimation unit (481.3) configured to estimate a third PSC channel set scrambled by a third primary scrambling code; and
a third PSC cancellation unit (482.3) configured to cancel the estimated third PSC channel set from the received signal.

19. The apparatus of claim 18, the second PSC estimation unit coupled to the output of the first PSC cancellation unit, the third PSC estimation unit coupled to the output of the second PSC cancellation unit.

20. The apparatus of claim 19, the first PSC channel set having a highest received signal strength, the second PSC channel set having a second highest received signal strength, the third PSC channel set having a third highest received signal strength.

21. The apparatus of claim 18, the first SSC cancellation unit coupled to the output of the first PSC estimation unit, the second PSC estimation unit coupled to the output of the first SSC cancellation unit.

22. The apparatus of claim 15, further comprising:
a second SSC estimation unit (481.2.1) configured to estimate a second SSC channel set scrambled by a second secondary scrambling code;
a second SSC cancellation unit (482.2.1) configured to cancel the estimated second SSC channel set;
a third SSC estimation unit (481.3.1) configured to estimate a third SSC channel set scrambled by a third secondary scrambling code; and
a third SSC cancellation unit (482.3.1) configured to cancel the estimated third SSC channel set.

23. The apparatus of claim 15, the first SSC estimation unit configured to estimate a noise power of a zero-power channel scrambled by the first secondary scrambling code.

24. The apparatus of claim 15, the first SSC channel set comprising at least one quasi-orthogonal function.

25. An apparatus comprising:
means (481.1) for estimating a first PSC channel set scrambled by a first primary scrambling code;
means (482.1) for cancelling the estimated first PSC channel set from a received signal;
means (481.1.1) for estimating a first SSC channel set scrambled by a first secondary scrambling code, wherein the estimating of the first SSC channel set is done on at least one of the channels in the SSC channel set that is transmitted with no transmit power,
the first SSC channel set being non-orthogonal to the first PSC channel set, the first PSC and SSC channel sets being transmitted from a single station; and
means (482.1.1) for cancelling the estimated first SSC channel set.

26. The apparatus of claim 25, further comprising:
means (481.2) for estimating a second PSC channel set scrambled by a second primary scrambling code;
means (482.2) for cancelling the estimated second PSC channel set;
means (481.3) for estimating a third PSC channel set scrambled by a third primary scrambling code; and
means (482.3) for cancelling the estimated third PSC channel set.

27. A non-transitory computer-readable storage medium storing instructions for causing a computer to:
estimate (610) a first PSC channel set scrambled by a first primary scrambling code;
cancel (620) the estimated first PSC channel set from a received signal;
estimate (630) a first SSC channel set scrambled by a first secondary scrambling code, the first SSC channel set being non-orthogonal to the first PSC channel set, the first PSC and SSC channel sets being transmitted from a single station, wherein the estimate of the first SSC channel set is done on at least one of the channels in the SSC channel set that is transmitted with no transmit power; and
cancel (640) the estimated first SSC channel set.

28. The non-transitory computer-readable storage medium of claim 27, further storing instructions for causing a computer to:
estimate (650) a second PSC channel set scrambled by a second primary scrambling code;
cancel (660) the estimated second PSC channel set;
estimate (670) a third PSC channel set scrambled by a third primary scrambling code; and
cancel (680) the estimated third PSC channel set.

* * * * *